(12) United States Patent
McDonough

(10) Patent No.: US 6,771,691 B1
(45) Date of Patent: Aug. 3, 2004

(54) SYSTEM AND METHOD FOR EXTRACTING SOFT SYMBOLS IN DIRECT SEQUENCE SPREAD SPECTRUM COMMUNICATIONS

(75) Inventor: John G. McDonough, La Jolla, CA (US)

(73) Assignee: Texas Instruments Incorporated, Dallas, TX (US)

( * ) Notice: Subject to any disclaimer, the term of this patent is extended or adjusted under 35 U.S.C. 154(b) by 625 days.

(21) Appl. No.: 09/663,836

(22) Filed: Sep. 15, 2000

(51) Int. Cl.[7] .............................................. H04B 1/69
(52) U.S. Cl. ...................................... 375/148; 375/130
(58) Field of Search ................................. 375/148, 130, 375/147, 316, 324, 340, 261

(56) References Cited

U.S. PATENT DOCUMENTS

| | | | |
|---|---|---|---|
| 4,901,307 A | 2/1990 | Gilhousen et al. | 370/18 |
| 5,056,109 A | 10/1991 | Gilhousen et al. | 375/1 |
| 5,101,501 A | 3/1992 | Gilhousen et al. | 455/33 |
| 5,103,459 A | 4/1992 | Gilhousen et al. | 375/1 |
| 5,109,390 A | 4/1992 | Gilhousen et al. | 375/1 |
| 5,228,054 A | 7/1993 | Rueth et al. | 375/1 |
| 5,237,586 A | 8/1993 | Bottomley | 375/1 |
| 5,267,261 A | 11/1993 | Blakeney, II et al. | 375/1 |
| 5,267,262 A | 11/1993 | Wheatley, III | 375/1 |
| 5,305,349 A | 4/1994 | Dent | 375/1 |
| 5,383,219 A | 1/1995 | Wheatley, III et al. | 375/1 |
| 5,414,728 A | 5/1995 | Zehavi | 375/200 |
| 5,490,165 A * | 2/1996 | Blakeney et al. | 370/335 |
| 5,506,865 A * | 4/1996 | Weaver, Jr. | 370/335 |
| 5,764,687 A * | 6/1998 | Easton | 375/147 |
| 5,903,550 A | 5/1999 | Spock | 370/335 |
| 5,987,076 A | 11/1999 | Zehavi et al. | 375/340 |
| 6,285,655 B1 * | 9/2001 | Lundby et al. | 370/209 |
| 6,625,199 B1 * | 9/2003 | McDonough | 375/140 |

FOREIGN PATENT DOCUMENTS

WO     WO 00/48330 A     8/2000

OTHER PUBLICATIONS

"Performance Analysis of Phasor Estimation Algorithms for a FDD–UMTS Rake Receiver", J. Baltersee, et al., IEEE 6th Int. Symposium on Spread–Spectrum Tech. & Appl., New Jersey, vol. 2, Sep. 6, 2000, pp. 476–480, XP010516624.

\* cited by examiner

Primary Examiner—Khai Tran
(74) Attorney, Agent, or Firm—Ronald O. Neerings; Wade James Brady, III; Frederick J. Telecky, Jr.

(57) ABSTRACT

An integrated circuit including a demodulating finger is provided for variably extracting symbols in the demodulation process of spread spectrum signals. Following the uncovering of an information channel sample stream, partial I and Q accumulations are supplied at a rate of one partial I and Q accumulation per four PN chips. A dot product operation is then performed upon these partial I and Q accumulations using a pilot estimate, and the resulting partial symbols are accumulated in a second process, where the soft symbols can be selectively supplied with a symbol period in the range from 4 to 2048 PN chips. In this manner, the symbol accumulation process can be made to work with a wide variety of information channel symbol rates. A method for partially accumulating soft symbols, both before and after the dot product operation, is also provided.

20 Claims, 3 Drawing Sheets

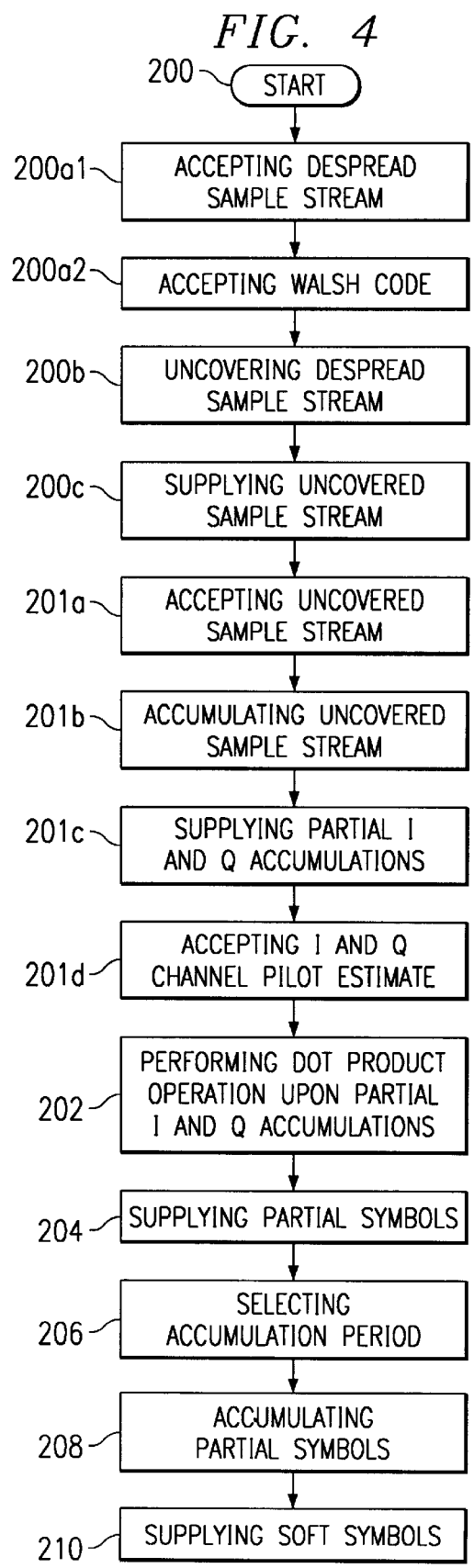

SYSTEM AND METHOD FOR EXTRACTING SOFT SYMBOLS IN DIRECT SEQUENCE SPREAD SPECTRUM COMMUNICATIONS

BACKGROUND OF THE INVENTION

1. Field of the Invention

The present invention relates generally to the field of spread spectrum communications and, more particularly, to the extraction of soft symbols from an information channel in a sample stream, for code division multiple access (CDMA) RAKE integrated circuit receivers.

2. Description of Related Art

In spread spectrum communications systems, such as in CDMA systems, pseudorandom noise (PN) sequences are used to generate spread spectrum signals by increasing the bandwidth (i.e., spreading) of a baseband signal. A forward link waveform transmitted by the base station may be comprised of a pilot waveform and data waveforms. Each of the waveforms are received with the same relative phase and amplitude distortions introduced by the channel. The pilot waveform is an unmodulated PN sequence which aids in the demodulation process, as is well-known in the art as "pilot-aided demodulation." Conventional pilot-aided demodulation methods typically include the steps of (i) demodulating a pilot waveform, (ii) estimating the relative phase and amplitude of the pilot waveform, (iii) correcting the phase of the data waveform using the estimated phase of the pilot waveform, and (iv) adjusting the weights of symbols used in maximal ratio combining in a RAKE receiver based on the estimated amplitude of the associated pilot waveform. Steps (iii) and (iv) above are performed as a "dot product" as is known in the art. Typically, Steps (i) through (iv) are performed using hardware. In some conventional methods, a controller having a central processing unit (CPU) and and/or a digital signal processor (DSP), with additional hardware blocks, may perform part of the above-described process.

FIG. 1 illustrates a conventional IS-95A or TIA/EIA-95-B forward link base station transmitter section 10 (prior art). A pilot channel 12 is generated that has no data. That is, the data is predetermined to be all "0" bits. The pilot channel is modulated, or covered with a Walsh code from Walsh code generator 14 at 1.2288 Mcps (mega chips per second). 64 orthogonal Walsh codes, each of 64 chips, are used in the IS-95A and TIA/EIA-95-B systems. Each channel is modulated with a unique Walsh code. Walsh code $H_0$ is used to modulate the pilot channel.

Also depicted is a traffic or paging channel, which shall be referred to herein as an information channel. Data is input at one of a plurality of data rates from 9.6 kbps (kilobits per second) to 1.2 kbps. The data is encoded at encoder 16, at one bit per two code symbols, so that the output of the encoder 16 varies from 19.2 ksps (kilo symbols per second) to 2.4 ksps. Symbol repetition device 18 repeats the codes from 1 to 8 times to create a 19.2 ksps signal. Alternately stated, either 1, 2, 4, or 8 modulation symbols are created per code symbol. Then, the information channel is scrambled with a long code at the same 19.2 ksps rate. The information channel is covered with a different Walsh code from that used to cover the pilot channel, code $H_T$ for example.

After being covered with a Walsh code, each channel is split into I and Q channels, and spread with I and Q channel PN sequences. A 90 degree phase shift is introduced by multiplying the I channel with a sin function, while the Q channel is multiplied with a corresponding cosine function. Then, the I and Q channels are summed into a QPSK channel. In the IS-95A and TIA/EIA-95-B standards, the same baseband symbols are assigned to both the I and Q channels. The composite waveform of all the QPSK channels, including pilot, synchronization, paging, and traffic channels is then up-converted in frequency (not shown) and transmitted.

FIG. 2 is a conventional IS-95A or TIA/EIA-95-B CDMA receiver (prior art). At the mobile station receiver 50, the transmitted signals are accepted as analog information, split into I and Q channels, and converted into a digital sample stream at A/D 52. Conventionally, a multi-finger RAKE is used to variably delay and amplify multipath delays in the sample stream, so that degradation due to fading can be minimized. Three demodulating fingers, demodulating finger 1 (54), demodulating finger 2 (56), and demodulating finger 3 (58) all receive the same I and Q sample stream. Each demodulating finger is assigned one of the sample stream multipath delays. PN codes and Walsh codes are generated with delays consistent with the multipath delays of the sample stream to be demodulated. The demodulated symbol streams from the multipaths are coherently combined in combiner 60 based on a maximal ratio combining (MRC) principle.

The IS-2000 standards propose, and future uses will include multiple information channels with a variety of symbol rates. A variety of symbol accumulation periods will be required in the process of demodulating these information channels. In IS-95A and TIA/EIA95-B standard communications, a symbol is conventionally spread with 64 PN chips at the transmitter. At the receiver, the symbol is recovered by despreading and accumulating the symbol over a period of 64 PN chips. The accumulated symbol is called a soft symbol. Conventionally, the soft symbol is corrected with respect to phase and weighted with respect to amplitude after accumulation, using the pilot waveform as a phase and amplitude reference. Although this method of correction is known to work when symbols are spread with 64 chips, longer accumulations before correction may result in degraded receiver performance.

Over the accumulation period, the phase of the received symbol is potentially changing. The dot product operation upon the symbol uses an average phase, to correct symbol phase. The rate of phase change is assumed to be slow relative to the soft symbol rate, so that a single phase correction can be used over the symbol period. However, if the accumulation period is so long that the phase at the beginning of the accumulation period becomes significantly out of phase with the phase at the end of the accumulation period, then a single phase correction for the entire accumulation period will not be effective, and would result in significant performance loss.

It would be advantageous if a CDMA RAKE receiver could be designed to maximize flexibility, permitting demodulating fingers to accumulate symbols in an information channel, regardless of the information channel symbol rate. Likewise, it would be desirable if the demodulating finger could be designed so that the various finger channels of the demodulating finger could operate at independent symbol rates.

It would also be advantageous if a CDMA RAKE receiver demodulating finger could be designed to be flexible enough to accumulate symbols for a wide variety of information channel symbol rates.

It would be advantageous if symbol accumulation could be performed to permit reasonably frequent phase corrections using pilot channel estimates.

It would be advantageous if the symbols could be partially accumulated before the dot product correction using the pilot estimate, and then further accumulated.

It would likewise be advantageous if the above-mentioned partial accumulation process could be accomplished over a wide range of symbol rates.

SUMMARY OF THE INVENTION

Accordingly, in spread spectrum communications, a demodulating finger integrated circuit is provided for extracting soft symbols from a sample stream including a plurality of information channels. The demodulating finger comprises a plurality of finger channels, and each finger channel includes a first accumulator, a dot product unit, and a variable accumulator. The first accumulator accepts an uncovered sample stream and accumulates the uncovered sample stream to supply partial I and Q accumulations to the dot product unit. The first accumulator supplies partial I and Q accumulations at a rate of one partial I and Q accumulation per four PN chips. The dot product unit accepts partial I and Q accumulations and a pilot estimate. In response, the dot product unit provides partial symbols. The variable accumulator, connected to the dot product unit output, accepts accumulation period commands and supplies soft symbols at a rate responsive to the accumulation period commands. The variable accumulator permits the demodulating finger to be used in demodulating information channels at various information channel symbol rates. Specifically, the variable accumulator supplies soft symbols with a symbol period in the range between 4 and 2048 PN chips.

A method is also provided for extracting soft symbols from a sample stream including a plurality of information channels, using an integrated circuit including a demodulating finger. The method comprises: uncovering a sample stream to supply an uncovered sample stream; accumulating the uncovered sample stream to supply partial I and Q accumulations at a rate of one partial I and Q accumulation per four PN chips; performing a dot product operation upon the partial I and Q accumulations; in response to performing the dot product operation upon the partial I and Q accumulations, supplying scalar partial symbols; selecting an accumulation period to accumulate partial symbols at a symbol period in the range between 4 and 2048 PN chips; and, supplying soft symbols at a rate responsive to the selected accumulation period.

BRIEF DESCRIPTION OF THE DRAWING

FIG. 4 is a flowchart illustrating a method for extracting soft symbols from a sample stream including a plurality of information channels in a spread spectrum communications integrated circuit including a demodulating finger.

DETAILED DESCRIPTION OF THE PREFERRED EMBODIMENTS

Figure 3:
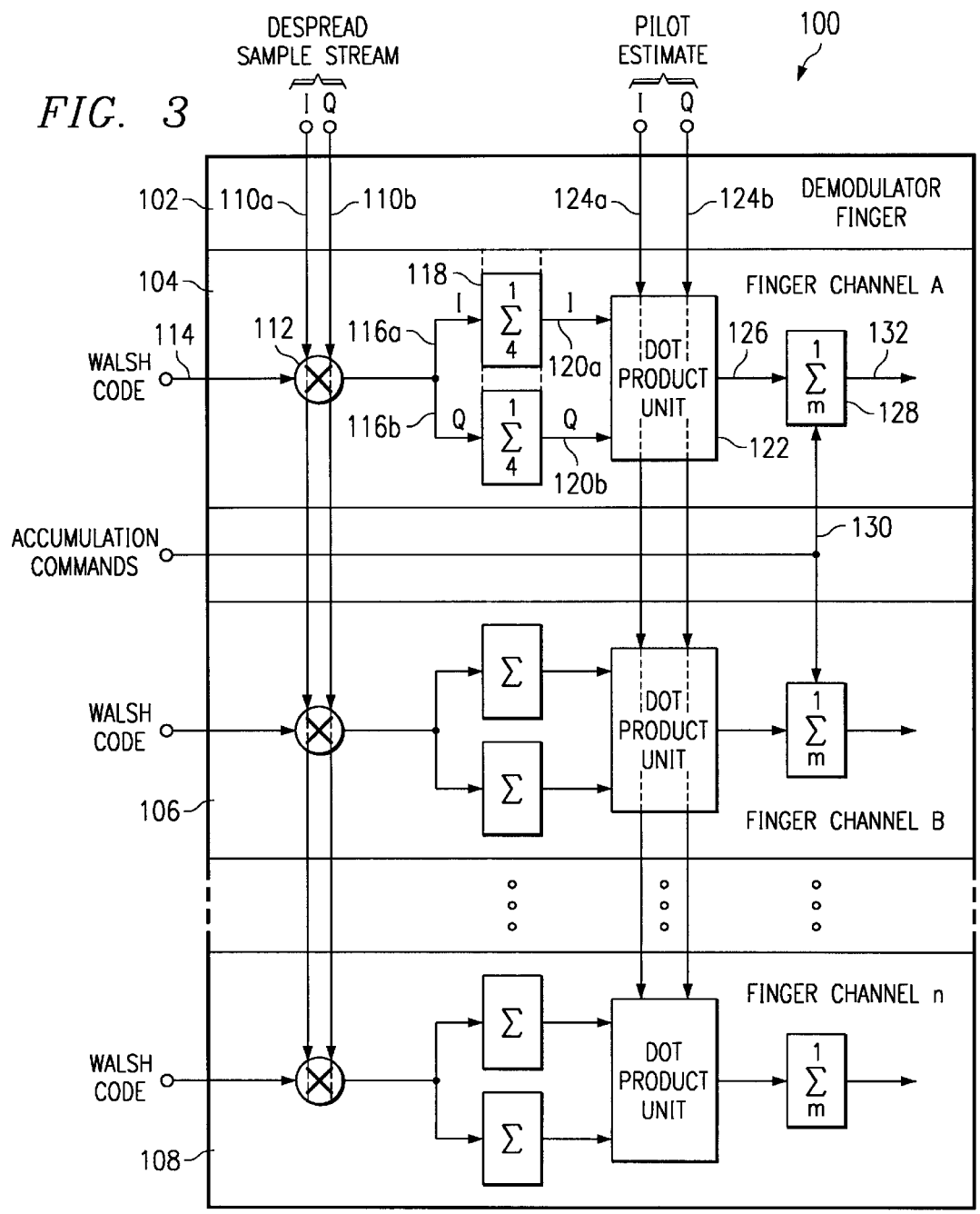
FIG. 3 is a schematic block diagram of the present invention demodulating finger integrated circuit for use in spread spectrum communications.

FIG. 3 is a schematic block diagram of the present invention demodulating finger integrated circuit for use in spread spectrum communications. Although the invention of FIG. 3 is depicted as a collection of hardware blocks it should be understood that the described functions can be enabled in a single integrated circuit (IC), or a cooperating family of ICs. Each CDMA RAKE receiver 100 typically includes a plurality of demodulating fingers, of which demodulating finger 102 is representative. Demodulating finger 102 includes a plurality of finger channels. Finger channel A (104), finger channel B (106), and finger channel n (108) are shown, where n can equal any integer. The present invention demodulating finger is not limited to any particular number of finger channels.

Figure 1:
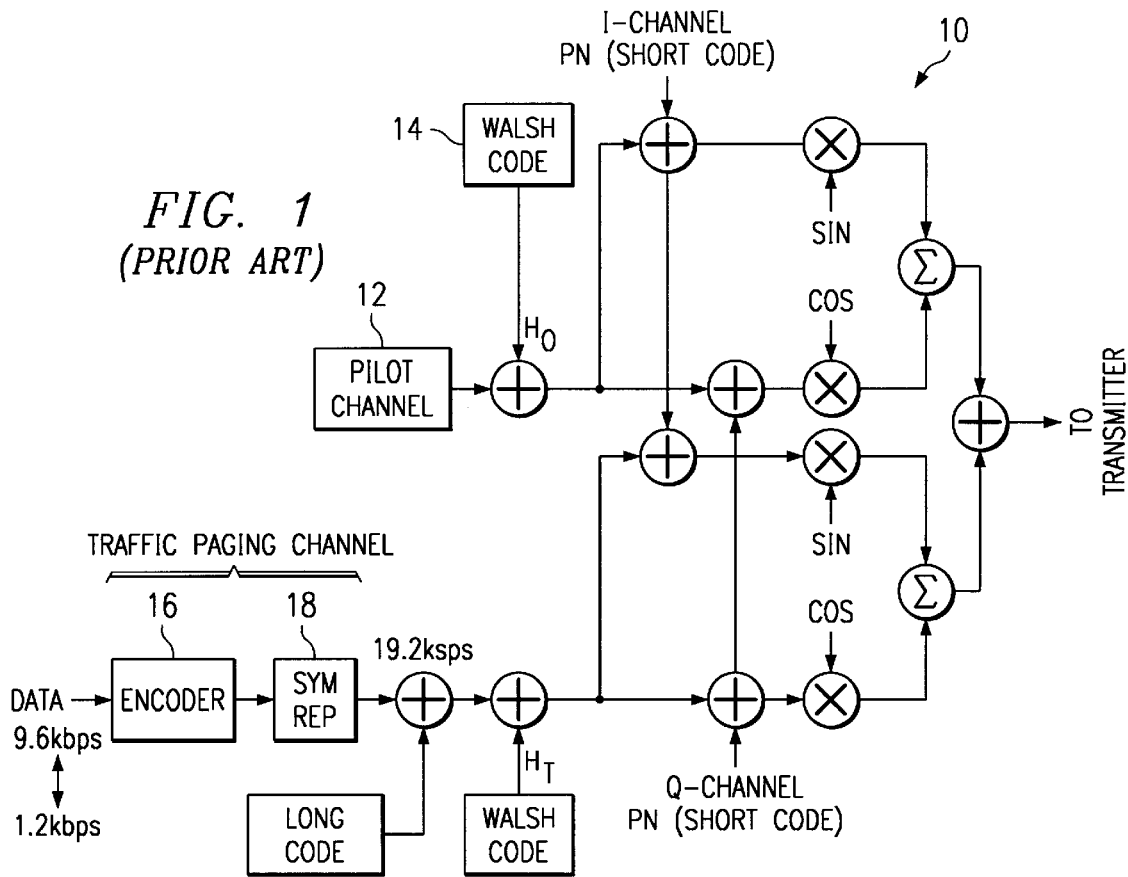
FIG. 1 illustrates a conventional IS-95A or TIA/EIA-95-B forward link base station transmitter section (prior art).
Figure 2:
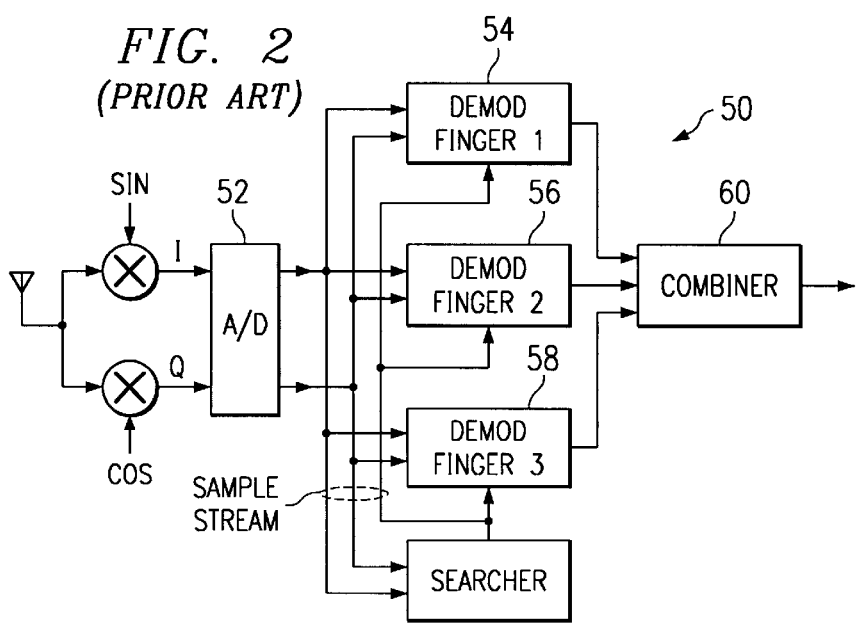
FIG. 2 is a conventional IS-95A or TIA/EIA-95-B CDMA receiver (prior art).

A sample stream including a plurality of information channels is supplied to each finger channel 104–108 on lines 110*a* and 110*b*. The sample stream, as described in the explanation of FIG. 1, is spread with a PN code when transmitted. Prior to being supplied to the finger channels 104–108, the sample stream is despread with the same PN code by a portion of the demodulating finger that is not shown. The PN code can be generated internally or externally to the demodulating finger. As is well known, the sample stream information channels are represented as I and Q channels corresponding respectively to lines 110*a* and 110*b*.

Each finger channel 104–108, as shown, includes uncovering units. Finger channel A 104, which is representative of the other finger channels includes uncovering unit 112. Uncovering unit 112 accepts the despread sample stream on lines 110*a* and 110*b* and a Walsh code on line 114. In response, the uncovering unit 112 supplies an uncovered sample stream. The I channel uncovered sample stream is output on line 116*a* and the Q channel uncovered sample stream is output on line 116*b*. The particular information channel that is uncovered or demodulated from the sample stream results from the particular Walsh code provided. The Walsh code can be generated either internally (not shown) or external to the demodulating finger 102.

The uncovered sample stream on lines 116*a* and 116*b* is supplied to a first accumulator 118, which includes separate accumulators for each of the I and Q channels. The first accumulator 118 accepts the uncovered sample stream, partially accumulates the uncovered sample stream, and has an output on lines 120*a* and 120*b* to supply partial I and Q accumulations. For example, in one aspect of the invention, the first accumulator 118 supplies partial I and Q accumulations at a rate of one partial I and Q accumulation per four PN chips. Alternately, other fixed accumulation rates could be used.

A dot product unit 122 has a first input on lines 120*a* and 120*b* to respectively accept partial I and Q accumulations and a second input on lines 124*a* and 124*b* to accept, respectively, the I and Q channels of the pilot estimate, or pilot channel. As is well known, the pilot channel is transmitted with predetermined data. Upon recovery and despreading (not shown) in receiver 100, the pilot channel symbols can be used as a phase and amplitude reference. That is, the phase of the symbols is corrected with respect to the known phase of the pilot waveform, and the symbol amplitude is weighted. The dot product unit 122 has an output on line 126 to supply partial symbols. Upon the performance of the well known dot product operation, the I and Q values are converted from vectors into partial symbols represented as scalar values.

A variable accumulator 128 has an input on line 126 connected to the dot product unit 122 output to accept the partial symbols. The variable accumulator 128 has a second input on line 130 to accept accumulation period commands, and an output on line 132 to supply soft symbols accumulated at a rate responsive to the accumulation period commands on line 130. As shown, variable accumulator 128 can be commanded to supply soft symbols with a symbol period in the range from 4 to m PN chips. In some aspects of the invention, m=2048.

Alternately, variable accumulator 128 can be commanded to supply soft symbols with a symbol period in the range from 4 to m=16,384 PN chips. It should be understood that the present invention is not limited to any particular value of m. Neither is the invention limited to any particular accumulation rate at the first accumulator 118.

The present invention advantageously permits the symbols to be partially accumulated after the dot product operation process. As mentioned in the Background Section above, the ability of the present invention to perform the dot product operation upon symbols, without completely accumulating them, avoids long accumulation periods with phase wrapping. There are practical advantages to splitting the accumulation task between the first accumulator 118 and the second accumulator 128. As can well be understood, there is a trade-off between performing the dot product operation after a small number, and a large number of PN chips. By fixing the first accumulator period to four PN chips, the dot product operation is performed over a fixed and relatively small accumulation period.

The variable accumulator 128 is adjusted in response to the information channel symbol rate to affect accumulation over the appropriate soft symbol period. Between the first accumulator 118 and the variable accumulator 128, finger channel A (104) is able to supply a soft symbol with a symbol period in the range from 4 to 2048 PN chips, to permit the demodulating finger to handle any existing, or likely to be proposed, information channel symbol rates.

FIG. 4 is a flowchart illustrating a method for extracting soft symbols from a sample stream including a plurality of information channels, in a spread spectrum communications integrated circuit including a demodulating finger. Although the process is described as a sequence of numbered steps for clarity, no order should be inferred from the numbering unless explicitly stated. The process begins at step 200. Step 202 performs a dot product operation upon the partial I and Q accumulations. Step 204, in response to performing the dot product operation upon the partial I and Q accumulations, supplies partial symbols. Step 206 selects an accumulation period. Step 208 accumulates partial symbols at a rate responsive to the selected accumulation period. Step 210 supplies soft symbols in response to accumulating the partial symbols.

In some aspects of the invention, the spread spectrum signals are spread with a PN code at a PN chip rate. Then, selecting the accumulation period in Step 206 includes selecting an accumulation period to supply soft symbols with a symbol period in the range between 4 and 2048 PN chips. Alternately, the range is between 4 and 16,384 PN chips.

Some aspects of the invention include further steps. Step 200a1 accepts a despread sample stream. Step 200a2 accepts a Walsh code. Step 200b uncovers the despread sample stream using the Walsh code. Step 200c supplies the uncovered sample stream. Preceding the dot product operation upon the partial I and Q accumulations in Step 202, Step 201a accepts the uncovered sample stream. Step 201b accumulates the uncovered sample stream at a first accumulation rate. Step 201c, in response to accumulating the uncovered sample stream, supplies the partial I and Q accumulations. Step 201b typically accumulates the uncovered sample stream to supply partial I and Q accumulations at a rate of one partial I and Q accumulation per four PN chips.

In some aspects of the invention, the spread spectrum signals include I and Q channels. Then, accumulating the uncovered sample stream at the first accumulation rate in Step 201b includes accumulating uncovered sample stream I and Q channels. Supplying partial I and Q accumulations in Step 201c includes supplying partial accumulations of the I and Q channels.

In some aspects of the invention, Step 201d accepts an I and Q channel pilot estimate for the partial I and Q accumulations. Then, performing the dot product operation upon the partial I and Q accumulations in Step 202 includes using the I and Q channel pilot estimate as a reference. Supplying partial symbols in Step 204 includes supplying scalar partial symbols generated from the dot product operation. Therefore, accumulating the partial symbols at a rate responsive to the selected accumulation period in Step 208 includes accumulating scalar partial symbols.

An integrated circuit including a demodulating finger and corresponding method have been described for variably accumulating symbols in the demodulation process of spread spectrum communications. Following the uncovering of an information channel sample stream, partial I and Q accumulations are supplied at a fixed rate of one partial I and Q accumulation per four PN chips. A dot product operation is performed upon these partial I and Q accumulations using a pilot estimate, and the resulting partial symbols are accumulated in a second process, where the partial symbols are selectively accumulated with a symbol period in the range from 4 to 2048 PN chips. In this manner, the symbol accumulation process can be made to work with a wide variety of information channel symbol rates. Other embodiments and variations of the above-mentioned demodulating finger integrated circuit and method will occur to those skilled in the art.

I claim:

1. In a spread spectrum communications integrated circuit including a demodulating finger for extracting soft symbols from a sample stream including a plurality of information channels, the demodulating finger comprising:

at least one finger channel each finger channel including:
a dot product unit having a first input to accept partial I and Q accumulations, a second input to accept a pilot estimate, and an output to supply partial symbols; and
a variable accumulator having an input connected to the dot product unit output to accept partial symbols, a second input to accept accumulation period commands, and an output to supply soft symbols accumulated at a rate responsive to the accumulation period commands.

2. The demodulating finger of claim 1 in which spread spectrum signals are spread with a PN code at a PN chip rate; and wherein the variable accumulator supplies soft symbols with a symbol period in the range between 4 and 6,384 PN chips.

3. The demodulating finger of claim 1 in which spread spectrum signals are spread with a PN code at a PN chip rate; and wherein the variable accumulator supplies soft symbols with a symbol period in the range between 4 and 2048 PN chips.

4. The demodulating finger of claim 1 further comprising:
a first accumulator having a first input to accept an uncovered sample stream and an output to supply partial I and Q accumulations.

5. The demodulating finger of claim 4 in which the spread spectrum signals are spread with a PN code at a PN chip rate; and
wherein the first accumulator supplies partial I and Q accumulations at a rate of one partial I and Q accumulation per four PN chips.

6. The demodulating finger of claim 5 in which the spread spectrum signals include I and Q channels; and
wherein the first accumulator input accepts uncovered sample stream I and Q channels and the output supplies partial accumulations of the I and Q channels.

7. The demodulating finger of claim 6 wherein the dot product unit first input accepts partial I and Q accumulations and the second input accepts an I and Q channel pilot estimate, the dot product unit performing a dot product operation upon the partial I and Q accumulations, using the pilot estimate, to supply partial symbols as scalar values.

8. The demodulating finger of claim 7 wherein the second accumulator accepts the partial symbols and supplies soft symbols at a rate responsive to the accumulation period commands.

9. The demodulating finger of claim 4 wherein each finger channel further includes:
an uncovering unit having a first input to accept a despread sample stream, a second input to accept a Walsh code, and an output connected to the first accumulator input to supply the uncovered sample stream.

10. In a spread spectrum communications integrated including a demodulating finger for extracting soft symbols from a sample stream including a plurality of information channels, the demodulating finger comprising:
a plurality of finger channels, each finger channel including:
a first accumulator having a first input to accept an uncovered sample stream and an output to supply partial I and Q accumulations;
a dot product unit having a first input connected to the first accumulator output to accept partial I and Q accumulations, a second input to accept a pilot estimate, and an output to supply partial symbols; and
a variable accumulator having an input connected to the dot product unit output to accept partial symbols, a second input to accept accumulation period commands, and an output to supply soft symbols at a rate responsive to the accumulation period commands.

11. In a spread spectrum communications integrated circuit including a demodulating finger, a method for extracting soft symbols from a sample stream including a plurality of information channels, the method comprising:
performing a dot product operation upon partial I and Q accumulations;
in response to performing the dot product operation upon the partial I and Q accumulations, supplying partial symbols;
selecting an accumulation period;
accumulating the partial symbols at a rate responsive to the selected accumulation period; and
in response to accumulating the partial symbols, supplying soft symbols.

12. The method of claim 11 in which spread spectrum signals are spread with a PN code at a PN chip rate; and
wherein selecting the accumulation period includes selecting an accumulation period includes selecting an accumulation period to supply soft symbols with a symbol period in the range between 4 and 16,384 PN chips.

13. The method of claim 11 in which spread spectrum signals are spread with a PN code at a PN chip rate; and
wherein selecting the accumulation period includes selecting an accumulation period to supply soft symbols with a symbol period in the range between 4 and 2048 PN chips.

14. The method of claim 11 further comprising:
preceding the performing of the dot product operation upon the partial I and Q accumulations, accepting an uncovered sample stream;
accumulating the uncovered sample stream at a first accumulation rate; and
in response to accumulating the uncovered sample stream, supplying the partial I and Q accumulations.

15. The method of claim 14 in which spread spectrum signals are spread with a PN code at a PN chip rate; and
wherein accumulating the uncovered sample stream at the first accumulation rate includes supplying partial I and Q accumulations at a rate of one partial I and Q accumulation per four PN chips.

16. The method of claim 14 further comprising:
preceding the accepting of the uncovered sample stream, accepting a despread sample stream;
uncovering the despread sample stream; and
supplying the uncovered sample stream.

17. The method of claim 16 in which spread spectrum signals include I and Q channels; and
wherein accumulating the uncovered sample stream at the first accumulation rate includes accumulating uncovered sample stream I and Q channels; and
wherein supplying partial I and Q accumulations includes supplying partial accumulations of the I and Q channels.

18. The method of claim 17 further comprising:
accepting an I and Q channel pilot estimate; and
wherein performing a dot product operation upon the partial I and Q accumulations includes using the I and Q channel pilot estimate as a reference; and
wherein supplying partial symbols includes supplying scalar partial symbols.

19. The method of claim 18 wherein accumulating the partial symbols at a rate responsive to the selected accumulation period includes accumulating scalar partial symbols.

20. The method of claim 16 further comprising:
accepting a Walsh code; and
wherein uncovering the despread sample stream includes using the Walsh code to uncover the despread sample stream.

* * * * *